United States Patent [19]
Dennison, Jr. et al.

[11] 4,330,776
[45] May 18, 1982

[54] KEYBOARD TYPE OF INPUT CONTROL SYSTEM FOR AN ANALYTICAL INSTRUMENT

[75] Inventors: Allan G. Dennison, Jr., Acton; Stanley B. Smith, Jr., Westford; Robert A. Fonteyn, Lexington; Robert V. Jarratt, Jr., Groton, all of Mass.

[73] Assignee: Instrumentation Laboratory Inc., Lexington, Mass.

[21] Appl. No.: 127,246

[22] Filed: Mar. 4, 1980

[51] Int. Cl.³ .............................................. G06F 3/02
[52] U.S. Cl. ............................ 340/365 R; 235/145 R; 340/365 VL
[58] Field of Search ................. 340/365 R, 365 VL; 400/473; 179/90 K; 35/5, 6; 235/145 R, 146; 364/200, 900, 709; 339/31 R; 434/227

[56] References Cited

U.S. PATENT DOCUMENTS

| | | | |
|---|---|---|---|
| 3,940,758 | 2/1976 | Margolin | 340/365 R |
| 4,092,527 | 5/1980 | Luecke | 340/365 VL |
| 4,107,784 | 8/1978 | Van Bemmelen | 340/365 VL |
| 4,119,839 | 10/1978 | Beckmann et al. | 235/145 R |
| 4,208,081 | 6/1980 | Kekas et al. | 340/365 R |

Primary Examiner—James J. Groody

[57] ABSTRACT

An input control includes first and second keyboard assemblies mounted on a common structural unit, an encoder on the unit, and a plurality of output conductors connected to the encoder for transmitting a binary coded signal when a key is actuated. The first keyboard assembly includes a set of keys that generate the same input control function signals as do the keys in the second keyboard assembly. The structural unit is mounted for rotation between an upright position in which only the first keyboard assembly is operator accessible and an inverted position in which only the second keyboard assembly is operator accessible. A latch is provided for locking the structural unit in either position.

6 Claims, 6 Drawing Figures

KEYBOARD TYPE OF INPUT CONTROL SYSTEM FOR AN ANALYTICAL INSTRUMENT

This invention relates to input control systems for analytical instruments or the like.

Operator control of complex instrumentation is commonly obtained through a keyboard arrangement which, in response to actuation of each key, provides a coded output signal corresponding to the associated alphanumereic character or control function specified by that key. Such keyboard input devices are used to establish and change particular process sequences of the instrumentation as well as to initiate analytical and like sequences using the instrumentation. Frequently, such instrumentation will be run by operators who are relatively untrained and do not have the comprehension or competance to modify established process sequences provided by the instrumentation.

In accordance with the invention there is provided an input control system for an analytical instrument or the like that includes an input control unit that has first and second arrays of keys, the second array of keys providing a selected portion of input control functions different from the input control functions provided by the first array of keys. The control system further includes movable means for rendering only said second array of keys operator accessible.

In a particular embodiment the input control includes first and second keyboard assemblies mounted on a common structural unit, an encoder on the unit, and a plurality of output conductors connected to the encoder for transmitting a binary coded signal when a key is actuated. The first keyboard assembly includes a further set of keys in addition to the first array of keys that duplicates the input control functions provided by the second array of keys in the second keyboard assembly, each key in the further set providing the same code signal as a corresponding key in the second keyboard assembly. The structural unit is mounted for rotation between an upright position in which only the first keyboard assembly is operator accessible and an inverted position in which only the second keyboard assembly is operator accessible. Latch means are provided for locking the structural unit in either position.

While the invention is useful with various types of analytical instrument systems, it is particularly useful with a spectroanalysis system in which an emission source of the plasma type is optically coupled to an analysis unit, and the input control generates commands for the control of both the source and the analysis unit. The second keyboard assembly permits an operator to run, but not to vary, analysis sequences and the first keyboard assembly permits an operator to vary analysis sequences (including selection of such variables as wavelength), as well as to run analysis sequences.

Thus, the invention provides an improved input control particularly useful with sophisticated instrumentation which system facilitates use of the instrumentation by both highly skilled personnel and by relatively untrained technicians, while permitting isolation of such technicians from the more complex capabilities of the instrument system, for example where access to such capabilities might involve risk of error, harm to the equipment or to operating personnel, or the like.

Other features and advantages of the invention will be seen as the following description of a particular embodiment progresses, in conjunction with the drawings in which.

DESCRIPTION OF PARTICULAR EMBODIMENT

Figure 1:
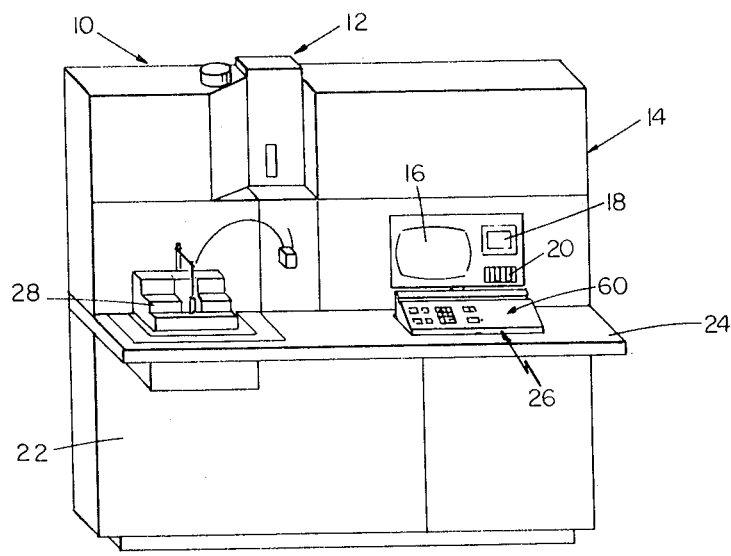
FIG. 1 is a perspective view of a plasma emission spectrometer incorporating the invention.

With reference to FIG. 1, there is shown a plasma emission spectrometer which includes an induction coupled plasma unit 10 which serves as an emission source; a rapid scanning double monochomator unit 12; and an electronics compartment 14. Further details of that analysis system may be seen with reference to copending application Ser. No. 118,916 filed Feb. 6, 1980, entitled Spectroanalysis System and assigned to the same assignee as this application, which application is incorporated herein by reference. Mounted on the face of electronics compartment 14 is a visual output display 16, a tape reader unit 18, and a storage compartment for a plurality of magnetic tape cassettes 20. Housed in the bottom portion 22 of the instrument are the power supplies and similar equipment. Projecting forward from the instrument is a horizontal shelf 24 that is located about desk height and that carries a keyboard unit 26 and a sampler unit 28 for samples to be analyzed.

Figure 2:
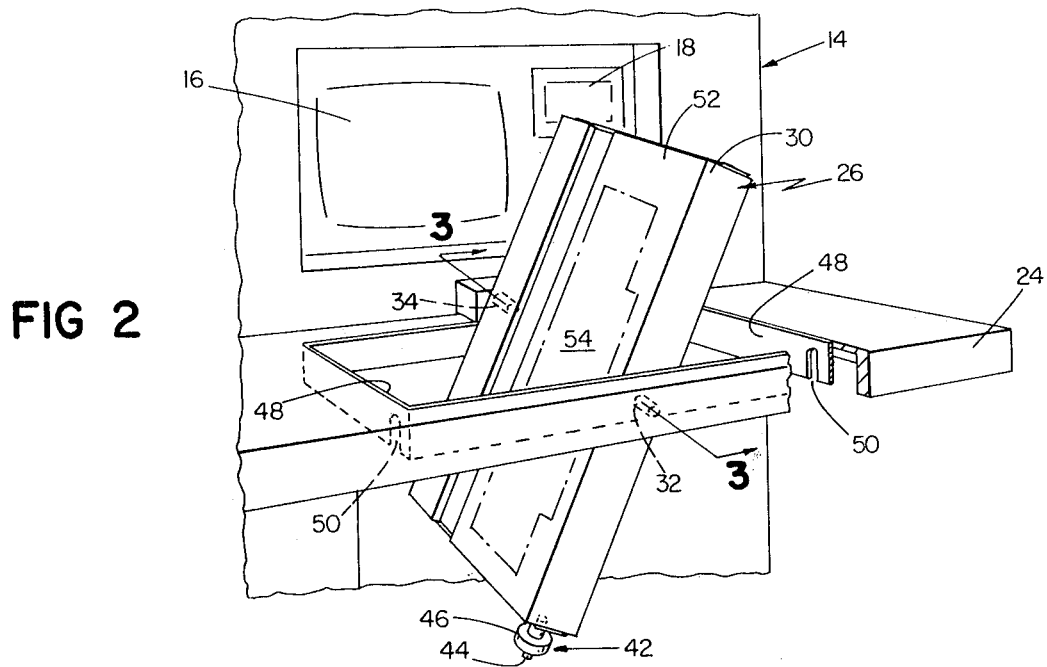
FIG. 2 is a perspective view showing the keyboard unit of the spectrometer of FIG. 1 in an intermediate position.
Figure 3:
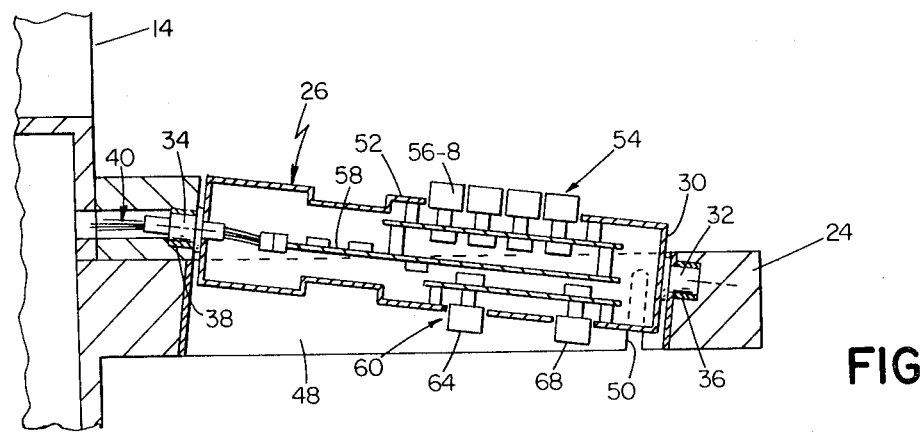
FIG. 3 is a sectional view taken along the line 3—3 of FIG. 2.

As shown in FIGS. 2 and 3, keyboard unit 26 includes a housing 30 with integral stub shafts 32, 34 that project from the front and rear sides of housing 30 respectively. Shaft 32 is received in bushing 36 at the front of shelf 24 and shaft 34 is received in bushing 38 at the rear of shelf 24 so that the keyboard unit 26 is disposed in inclined position. Cable 40 extends through shaft 34 and bushing 38 and provides communication between keyboard unit 26 and electronics compartment 14. Secured to one end of keyboard housing 30 is a projecting clamp mechanism 42 which includes threaded shaft 44 and clamp nut 46. Formed in each end wall 48 of the shelf opening in which the keyboard unit 26 is disposed is an inverted U-shape notch 50 which receives the threaded shaft 44. Nut 46 is tightened to clamp against the outer surface of end wall 48 and lock the keyboard in position. As will be seen, the keyboard may be rotated 180 degrees from the position shown in FIG. 1 to an inverted position, and locked in either position.

Figure 4:
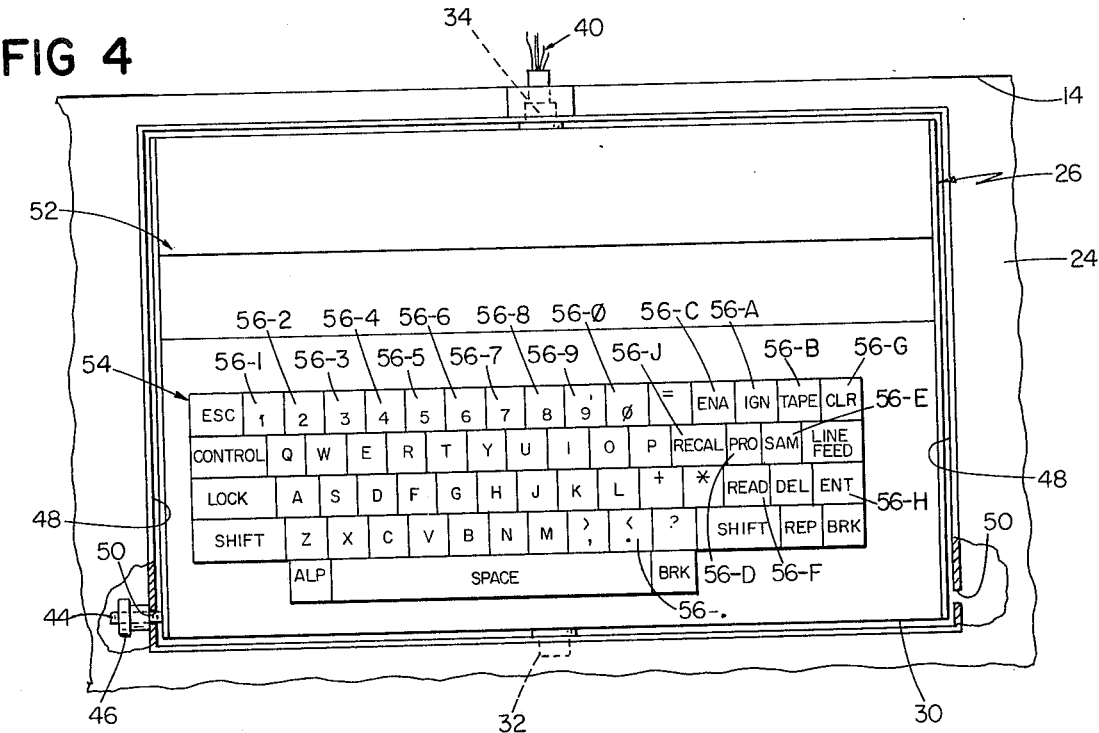
FIG. 4 is a top view of the keyboard unit.

Provided on side 52 of keyboard unit 26 is a conventional, commercially available keyboard array 54 (B70-05AB keyboard available from Cherry Electrical Products Corp.) that includes a full array of sixty-seven keys 56 and an encoder and output circuit board 58 that generates the full 128 character ASCII output code (a seven bit code with an eighth bit available for parity or other use as desired) over output cable 40. A plan view of keyboard 54 is shown in FIG. 4.

Figure 5:
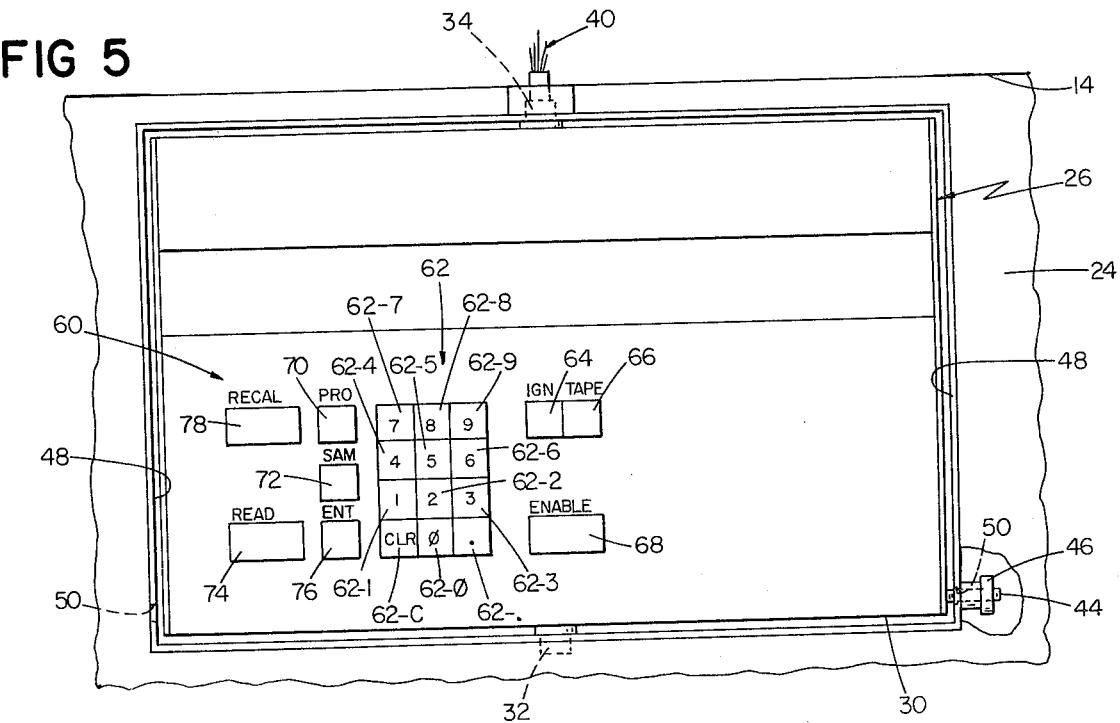
FIG. 5 is a view, similar to FIG. 4, showing the keyboard unit in inverted position.

Shown in FIG. 5 is the opposite face 60 of keyboard unit 26. That face includes a number pad 62 of twelve keys 62-1 - 62-0 plus a clear key 62-C and a decimal key 62-.; an igniter control (IGN) key 64 for controlling ignition of the plasma unit 10; a Tape key 66 for controlling reading into memory the contents of a cassette 20 through tape reader 18 (keys 64 and 66 being interlocked with Enable key 68); a Program key 70 for displaying the list of analysis programs stored in memory; a Sample Number key 72 for identifying the number of the sample to be analyzed; an initiate analysis (Load) key 74; an Enter key 76; and a recalibrate (Recal) key 78.

Keyboard 54 is used to enter information into the analysis instrument, including analysis sequence, control information, background correction data and standard data used for calibration. Once the analysis and related information has been entered, the entire sequence may be stored on a magnetic tape cassette 20. If an analysis is desired to be run that is not present in the computer memory, it is only necessary to select and insert a cassette 20 into the tape reader 18 and transfer the stored analysis information to memory of the instrument.

The simple keyboard 60 on the reverse side of the keyboard unit permits analyses to be run by almost untrained personnel. The functions of the keys in keyboard 60 are set out in the following table:

| Key Designation | Keyboard 60 | Keyboard 54 | ASCII Code Hexidecimal |
|---|---|---|---|
| Enter | 76 | 56-H | $\phi$0 |
| Enable | 68 | 56-C | 5E |
| IGN | 64 | 56-A | 5C |
| Tape | 66 | 56-B | $\phi$8 |
| Program | 70 | 56-D | 5B |
| Sample # | 72 | 56-E | 5D |
| Read | 74 | 56-F | 5F |
| Clear | 62-C | 56-G | $\phi\phi$ |
| Recal | 74 | 56-J | 4$\phi$ |
| $\phi$ | 62-$\phi$ | 56-$\phi$ | 3$\phi$ |
| 1 | 62-1 | 56-1 | 31 |
| 2 | 62-2 | 56-2 | 32 |
| 3 | 62-3 | 56-3 | 33 |
| 4 | 62-4 | 56-4 | 34 |
| 5 | 62-5 | 56-5 | 35 |
| 6 | 62-6 | 56-6 | 36 |
| 7 | 62-7 | 56-7 | 37 |
| 8 | 62-8 | 56-8 | 38 |
| 9 | 62-9 | 56-9 | 39 |
| . | 62-. | 56-. | 2E |

Figure 6:
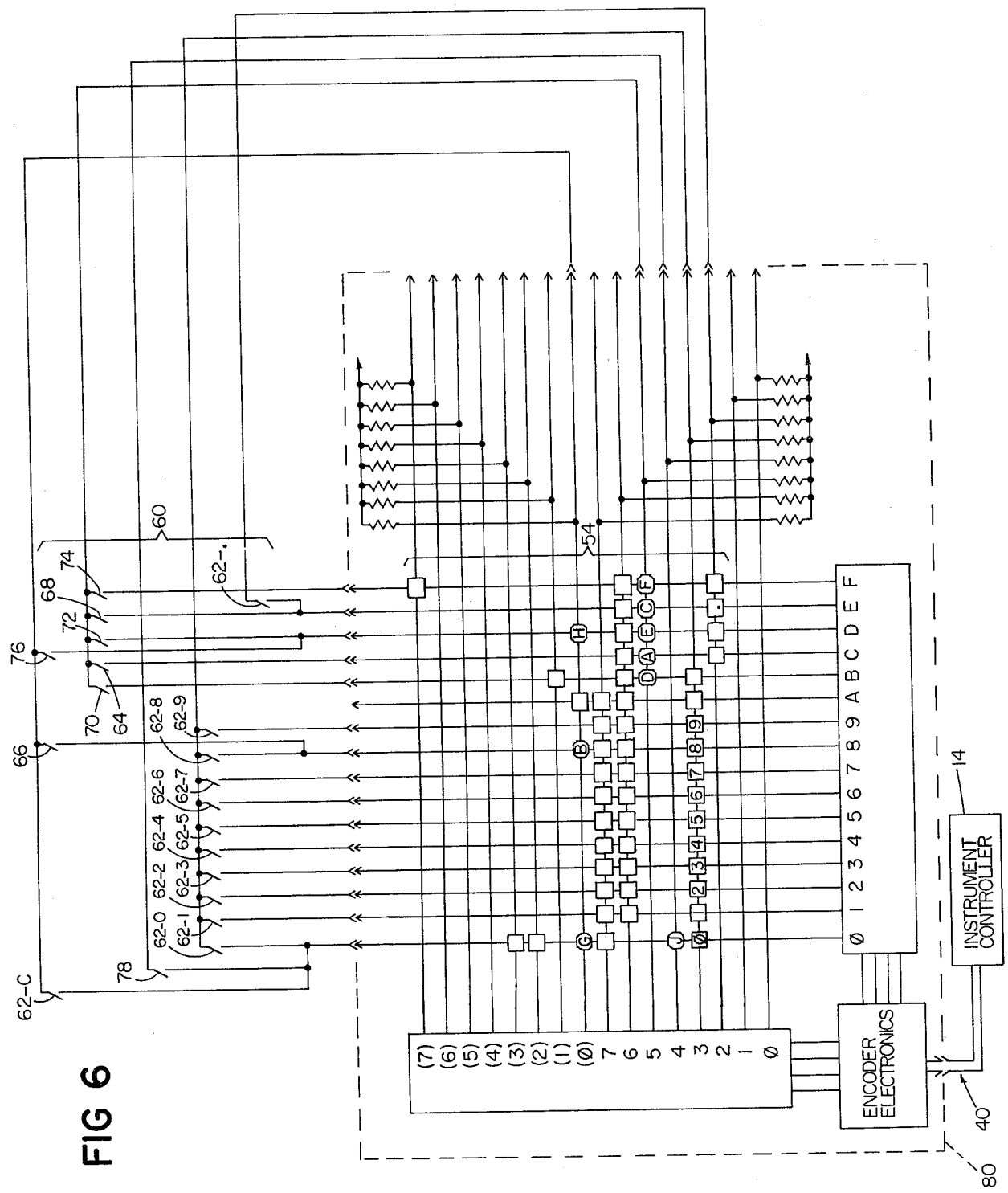
FIG. 6 is a schematic diagram showing the interrelation of the two sets of key arrays.

Shown in FIG. 6 is a diagram of the corresponding keys of the main and auxiliary keyboards 54, 60, and their relation to ASCII encoder 80 and output line 40. Indicated on encoder 80 are the keys of keyboard 54 with each key 56 bearing its corresponding designation thus "H" indicates Enter key 56-H, "A" indicates Ignition key 56-A, and "4" indicates numeral key 56-4.

In operation, with the keyboard unit in inverted position (as shown in FIG. 5) the operator may load all the programs from a tape cassette 20 by pressing tape key 66 and enable key 68. The tape reader 18 will load all the programs required for the basic setup and operation of the instrument, and the instrument will perform on a calibration sequence automatically.

After wavelength calibration, the display 16 provides a listing of all user generated programs. At this point, the system controller is in its "run" mode, and will respond to single key strokes from either keyboard 54 or 60 as compared to word commands in the "edit" mode that can be furnished only by keyboard 54.

With keyboard 60, the plasma torch is ignited by pressing enable key 68 and IGN key 64. The controller will then execute an automatic ignition sequence in which a graphite igniter is placed in the plasma chamber to simulate a plasma load, argon gas then purges the plasma chamber of oxygen for approximately 25 seconds, and electric current is then raised to ignite and sustain the plasma.

The operator chooses one of the existing programs identified on display 16 by depressing the keys corresponding to selected program number and then pressing the "read" key 74 in order to perform the analysis selected in that program. The CRT 16 displays the user generated program including all the elements and wavelengths selected. A sample is aspirated and analyzed and the results displayed. When the analysis is done, the concentrations are displayed on the CRT 16. To perform recalibration, the recal key 78 is pressed, the desired numbers of readings are entered and the enter key 76 is pressed so that the display 16 indicates the number of readings. The highest standard is then aspirated and the read key 74 is depressed, a reagent blank is aspirated and the read key 74 is again depressed.

Thus analyses may be performed with the simple keyboard 60 completely separate from the more sophisticated keyboard 54 for changing programming functions and without risk of error that might arise where those more complex capabilities were available to the technician.

While a particular embodiment of the invention has been shown and described, various modifications will be apparent to those skilled in the art and therefore it is not intended that the invention be limited to the disclosed embodiment or to details thereof and departures may be made therefrom within the spirit and scope of the invention.

What is claimed is:

1. An input control system for an analytical instrument that includes a spectroanalysis system having an emission source optically coupled to an analysis unit, comprising a controller that provides outputs to control an analysis sequence of said emission source and said analysis unit, an input control unit coupled to said controller, said input control unit having first and second arrays of keys, said first array of keys including a first set of keys that provides a first group of input control functions that permit an operator to run an analysis sequence provided by said controller for said emission source and said analysis unit, and a second set of keys that provides a second group of input control functions that permit an operator to vary the analysis sequence provided by said controller for said emission source and said analysis unit, said second array of keys providing the same input control functions as said first group of input control functions but not said second group of input control functions such that an operator is permitted to run, but not to vary, an analysis sequence provided by said controller for said emission source and said analysis unit, said second array including a set of keys that duplicate said first set of keys in said first array, and movable means having a first condition in which only said first array of keys is operator accessible and a second condition in which only said second array of keys is operator accessible.

2. The input control system of claim 1 wherein said first and second arrays of keys include first and second keyboard assemblies mounted in fixed position relative to one another on a common structural unit, an encoder on said unit, and a plurality of output conductors connected to said encoder for transmitting a binary coded signal to said controller when a key is actuated.

3. The input control system of claim 2 wherein said structural unit is mounted for movement between a first position in which only said first keyboard assembly is operator accessible and a second position in which only said second keyboard assembly is operator accessible.

4. The input control system of claim 2 wherein said structural unit is mounted for movement between a first position in which only said first keyboard assembly is operator accessible and a second position in which only said second keyboard assembly is operator accessible, and further including latch means for locking said structural unit in both said first position and said second position.

5. The input control system of claim 4 wherein said instrument includes support structure that has an opening therein, and said structural unit is mounted for rotational movement in said opening between a first (upright) position in which only said first keyboard assembly is operator accessible and a second (inverted) position in which only said second keyboard assembly is operator accessible, said latch means cooperating with said support structure for locking said structural unit in said first and second positions.

6. The input control system of claim 5 or 1 wherein said emission source is of the plasma type and both of said key arrays permit an operator to ignite said source for excitation of sample materials to spectroemissive condition and to run spectrochemical analysis sequences with said analysis unit.

* * * * *